(No Model.) 2 Sheets—Sheet 1.
C. LA DOW.
DISK HARROW.
No. 304,010. Patented Aug. 26, 1884.
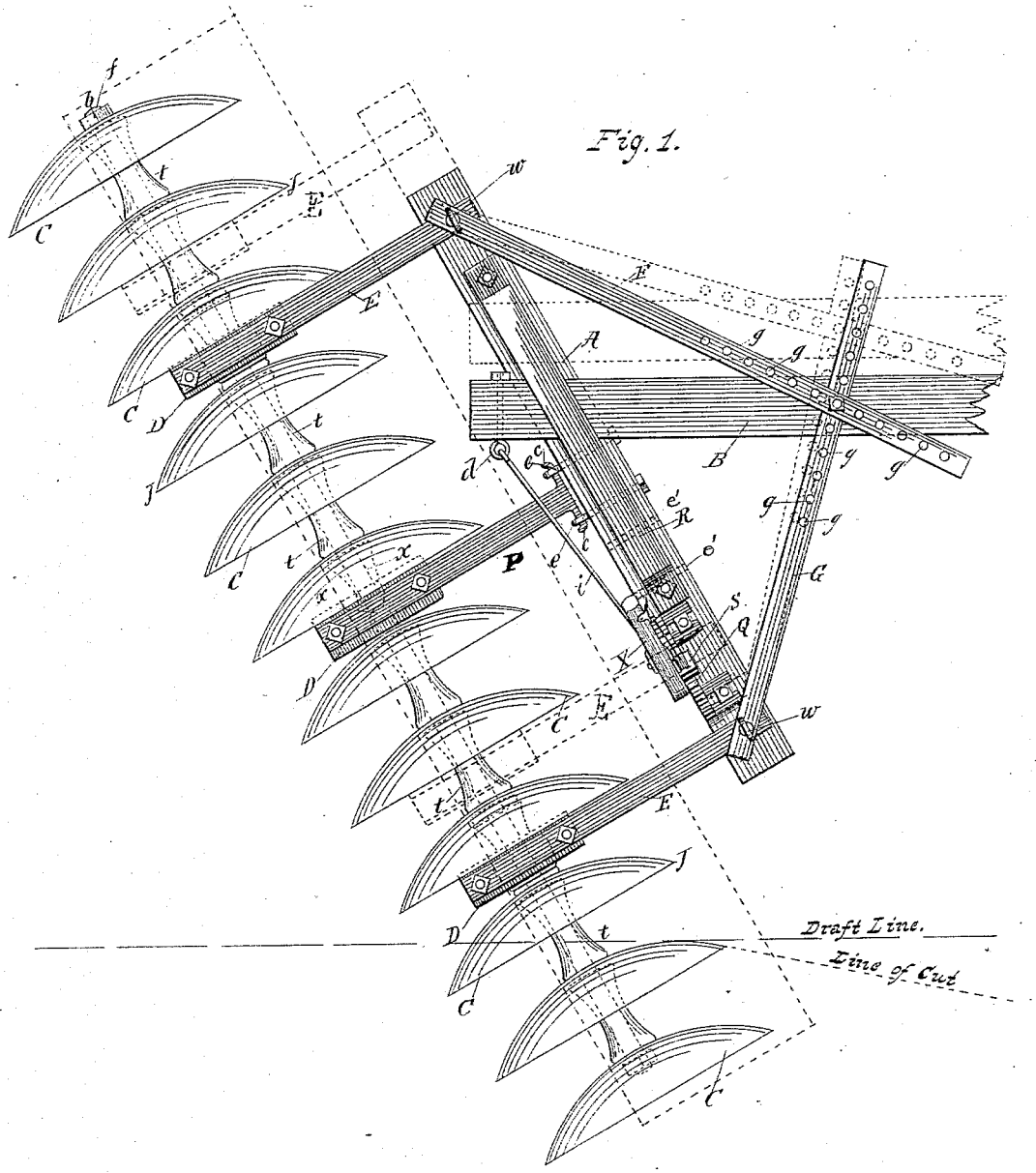

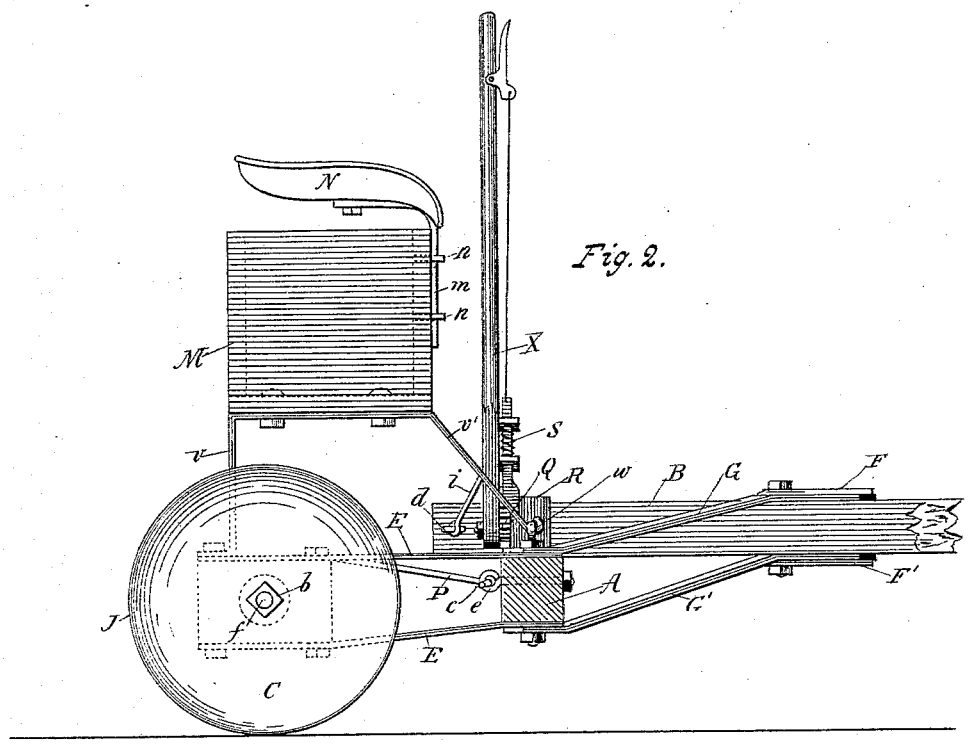

UNITED STATES PATENT OFFICE.

CHARLES LA DOW, OF ALBANY, NEW YORK.

DISK-HARROW.

SPECIFICATION forming part of Letters Patent No. 304,010, dated August 26, 1884.

Application filed February 14, 1882. (No model.)

*To all whom it may concern:*

Be it known that I, CHARLES LA DOW, a citizen of the United States, residing at the city and county of Albany, and State of New York, have invented a new and useful Improvement in Disk-Harrows, of which the following is a specification.

This invention relates to that class of harrows which employ concavo-convex disks for cutting and turning the soil.

The objects of the invention are, first, to construct in such a manner and arrange concavo-convex disks in such relation to the draft-frame that said disks shall all turn the earth in one common direction without swerving from the line of travel and without the necessity of auxiliary supports against side thrusts; second, to attach gangs of disks which turn the soil in one common direction to the draft-frame by hinge or other flexible connections, which shall maintain the disks in proper position relatively to the frame and to each other and permit the gangs to follow the unevenness of the surface traversed; third, to provide disks in gangs which turn the earth in one common direction with a box to receive and carry earth or other weight to enforce the penetration of the gang; fourth, to combine with disks which turn the earth in one common direction an adjustable pole or tongue which permits the angle between itself and the disks to be varied.

Referring to the drawings, Figure 1 represents a top view of my invention, showing a method of adjusting the pole bodily in lateral direction relatively to the draft-frame, also showing by dotted and broken lines the direction of the line of cut relative to the line of draft. Fig. 2 represents a side view of my invention. Fig. 3 represents a section of the concavo-convex disks and my improved method of beveling and sharpening the same.

The draft-frame of my invention consists of the cross-bar A and the braces G F and G' F'. C are concavo-convex disks mounted in gangs on axles *f*, and held at suitable distances apart on said axles by the spacing-spools *t*. The drawings represent the machine as having two gangs of said disks, and clamped together by the ball-and-socket joints *x x*, mounted in the bearing D, and held at relative distance from the cross-bar by the draw-bar P, which is hinged by the means of suitable bearings, *c c e e*, to the cross-bar A. The gangs are also supported near their centers by the ball-and-socket joints D D on the draw-bars E E, which are pivoted at *w w* to the cross-bar A. The ball-and-socket joints and their bearings D D D allow the gangs to freely vibrate vertically to conform to the unevenness of the surface traversed. The hinged draw-bar P allows the inner ends of the gangs to rise and fall, as circumstances may require.

It will be observed that the draw-bar P is hinged to the cross-bar in such manner as to prevent lateral swaying or endwise motion of the gangs relative to the cross-bar. The draw-bars E E are pivoted to the cross-bar in order that the journal-bearings on their rear ends may have lateral motion, so that they may be more readily applied and fastened in proper place on the axles in order to compensate for any inequality or variation in the length of the spools or thickness of the disks. When the disks are set at proper angles for work, the convex sides of their forward portions bear against the hard uncut earth in about the relative position in which they touch the broken draft-line in Fig. 1. The line of cut is carried by the curvature of the disk to the right of the draft-line, as shown by dotted lines in said Fig. 1. The pressure of the convex side of the disk against the uncut earth and the line of cut varying therefrom together exert as great a side thrust on the forward part of the convex side of the disks as is made by the side thrust of the loosened earth against the concave side of the rear portion of the disks. The said side thrusts counteract and neutralize each other, being applied to opposite sides of the disks, and compel them to run in a direct course with the line of travel and turn the earth in one common direction.

In order to enforce deep penetration of disks which are arranged to all turn the earth in one common direction, I mount above said disks a box, M, by means of supports *v v'*. This box is capable of receiving and carrying earth or other suitable weight, which causes the revolving disks to enter the earth deep or shallow in proportion to the weight carried by the box.

By experimenting with a full-sized machine in the field I have found that the condition of the soil and the amount of earth carried in the weight-box would vary the line of travel of the disks, and under some circumstances cause them to swerve from the direct line of travel. I have overcome said defect by adjusting the line of the pole relatively to the disk-gangs, and under some circumstances moving it bodily in a lateral direction on the draft-frame; and, also, still further aiding the same by moving the draw-bars E E laterally on the axles of the gangs for the purpose of applying the draft of the team to one side of the center of the machine. The same results can be accomplished by moving the gangs themselves relatively to the pole and draft-frame; but I prefer the construction which I will now describe in detail.

The pole B is mounted on the cross-bar A and held in place at its rear end by the long staple R, and by the ratchet-lever X, connection $i$, and eyebolt $d$. The pole is also held at a point in advance of the cross-bar by the braces F G and F' G', which braces form a pivotal connection for the pole at their junction therewith, an adjustable bolt passing through all the braces and through the pole for that purpose. The ratchet-lever X and its connection has lateral movement on the cross-bar, and moves the rear end of the pole to any desired point in the staple R, the pawl S on the ratchet-lever entering the segmental toothed rack $q$, and holding the rear end of the pole in any desired position.

It will be understood that the adjustable bolt passing through the braces and pole forms the point or center around which the pole moves when it is adjusted by the lever. The lever and connection may be dispensed with and the pole clamped to the cross-bar A in any desired position by simply tightening the bolts and nuts at the ends of the staple R, the pole being then firmly clamped and held in any desired position by frictional contact between the cross-bar and staple R. This adjustment may be performed by loosening one of the bolts and nuts at the end of staple R, moving the team to either right or left, and when the desired angle of the pole is ascertained it can be thus held by retightening the bolt and nut at the end of staple R.

The forward ends of the braces F G and F' G' are each provided with a series of small holes, $g$ $g$ $g$ $g$, and the said braces being pivoted to the cross-bar A by eyebolts $w$ $w$, the pole may be moved bodily, as shown in Fig. 1 by dotted lines, relatively to the cross-bar right or left, in order that the draft may be carried toward either end of the machine to assist in counteracting the side thrusts of the disks. The draw-bars E E, being pivoted at $w$ $w$, may be placed on the axle between other disks than those indicated at Fig. 1 in the drawings, said adjustment also assisting in counteracting the side thrusts of the disks.

When the draw-bars E E are adjusted between other disks than in the position shown in Fig. 1, the draw-bar P may also be adjusted laterally relative to the cross-bar by changing the position of the hinged bearings $e$ $e$, holes $e'$ being provided in the cross-bar A for that purpose. The bars E are shown in dotted lines, Fig. 1, as placed between other disks, and in that case the connection of the bar P with the cross-bar will be shifted to the holes $e'$, as just mentioned.

By referring to Fig. 1 of the drawings it will be observed that the disks are clamped to the axle in the usual manner by nuts $b$, and that the disks are arranged in line with each other and at an angle across the line of draft, and are thus adapted to turn the soil in one common direction. It will also be observed that the disks are disposed in two independent gangs in line with each other, capable of independent rotation in either direction, so that the machine may be turned to the right or left with facility.

The weight-box is hinged or hooked by its supports $v$ to the eyebolts $w$ $w$ on the cross-bar A. The rear parts of the supports $v$ $v$ are fastened by bolts to the draw-bars E E. By taking off the nuts from said bolts the weight-box can be unhinged from the eyebolts $w$ $w$, this construction forming a convenient means for applying or detaching the weight-box. The seat N is mounted on the weight-box M by means of the standard $m$ and staples $n$ $n$. It will be observed that the weight carried by the box is applied to the disk-gangs through their outer journal-bearings, D D, so that the box shall not be disturbed by nor prevent the vibratory movements of the disk-gangs. The weights may be removed from the box M and the pole adjusted at a right angle with the disks, in which position the machine may be drawn from one field to another without tearing up the earth and without swerving from the line of travel.

In Fig. 3 I have shown a cutting-disk beveled on its concave edge. The bevel inclines inwardly from the plane of the cutting-edge of the disk, and thus gives a sharp edge. By cutting the disk in this way a good edge is obtained, and the convex face of the disk is left uniform from its edge to the center, and is not liable to bind in the earth or become broken. This harrow may be constructed in one gang or in several, or the disks may be used on separate spindles. Disks of different size and curvatures may be used, and the form of adjustment may be multiplied, according to the choice of the manufacturer.

The results hereinbefore described can be accomplished by other forms of construction without departing from the principles of my invention, which contemplates such organization of parts as shall provide a harrow with revolving disks, which shall all turn the earth in one common direction, without swerving from the line of draft, when set at an angle thereto, and rely solely on its arrangement and adjustability of parts to accomplish said result without the aid of auxiliary wheels, colters, shoes, or other devices heretofore used for such purpose.

I am aware that in a patent herefore granted a machine is shown having two cutting-disks, a rudder-wheel, and a hinged pole capable of being adjusted to vary its angle relatively to the disks. I am also aware that a laterally-shifting tongue, broadly, is old, such a tongue being shown in a wheel-plow patent heretofore granted. I therefore make no claim to such subjects-matter.

Having described my invention, what I claim, and desire to secure by Letters Patent, is—

1. In a harrow, the combination of a pole, a draft-frame, cutting-disks thereon arranged to turn the earth in one common direction, mechanism for shifting the pole bodily relatively to the frame, and mechanism for varying the angle of the pole to the disk-gang, substantially as set forth.

2. In a harrow, the combination of a draft-frame, gangs of cutting-disks arranged to turn the soil in one common direction, and connections E between the frame and gangs which can be shifted laterally on the gang-shafts, for the purpose set forth.

3. In a harrow, the combination of a draft-frame, gangs of cutting disks arranged to turn the soil in one common direction, connections E between the frame and gangs which can be shifted laterally on the gang-shafts, a draw-bar, P, connected with the inner ends of the gang-shafts, and means by which the said draw-bar may be shifted on the frame to accommodate the shifting of the connections E on the gang-shafts.

4. In a harrow, the combination of a draft-frame, gangs of cutting-disks arranged to turn the earth in one common direction, and connections between the gangs and frame which permit the gangs to flex to conform to the inequalities of the surface traversed, substantially as set forth.

5. The combination of a draft-frame, gangs of disks arranged at or about in the same line across the path of the machine, and capable of rising and falling or flexing at their inner ends, draft-connections between the gangs and frame on which the gangs turn, and a weight-box arranged above the gangs, and supported thereon at or about the said draft-connections, substantially as set forth.

6. In a harrow, the combination of an adjustable pole, a draft-frame, gangs of disks placed across the line of the pole and arranged to turn the soil in one common direction, the disks forming the sole support and guide for the machine, and mechanism whereby the angle of the pole may be varied relatively to the gangs of cutters, substantially as described.

CHARLES LA DOW.

Witnesses:
RICHARD P. DUMARY,
WM. W. DIAMOND.